Jan. 27, 1970   E. C. MILLER   3,492,283
CONTROL OF CHEMICAL REACTIONS
Filed Dec. 29, 1964   2 Sheets-Sheet 1

INVENTOR
E.C. MILLER
BY
Young & Quigg
ATTORNEYS

Jan. 27, 1970  E. C. MILLER  3,492,283
CONTROL OF CHEMICAL REACTIONS
Filed Dec. 29, 1964  2 Sheets-Sheet 2

INVENTOR
E. C. MILLER
BY Young & Quigg
ATTORNEYS

United States Patent Office 3,492,283
Patented Jan. 27, 1970

3,492,283
CONTROL OF CHEMICAL REACTIONS
Elmer C. Miller, Bartlesville, Okla., assignor to Phillips Petroleum Company, a corporation of Delaware
Filed Dec. 29, 1964, Ser. No. 421,942
Int. Cl. C08f 1/06
U.S. Cl. 260—94.9
18 Claims

ABSTRACT OF THE DISCLOSURE

In a polymerization system, the actual density of the reaction mixture is measured and the concentration of the polymer in the reaction mixture is determined. In one embodiment a signal representative of the density which the reaction mixture would have with the determined polymer concentration and the desired monomer concentration is established and compared with the actual density to obtain a control signal for the manipulation of the monomer flow rate to the reactor to maintain the actual monomer concentration substantially at the desired value therefor. In a second embodiment the actual monomer concentration is determined and compared with the desired monomer concentration to obtain the control signal. The desired monomer concentration and desired reaction temperature can be established responsive to the desired values of melt flow ratio and melt index of the polymer to be produced.

---

This invention relates to the control of chemical reactions.

Various methods are known for producing normally solid and semi-solid polymers. For example, hydrocarbons, such as ethylene, propylene, isobutene, butadiene and styrene can be polymerized, either independently or in various admixtures with one another, to produce solid or semi-solid polymers or copolymers. Recently, considerable attention has been directed toward the production of solid olefin polymers, such as polymers of ethylene and/or propylene. The polymerizations are frequently carried out in the presence of a solid catalyst, utilizing a liquid solvent as the reaction medium. To obtain a uniform product having desired properties, the polymerization reaction is controlled by manipulating at least one of the process variables.

In accordance with the present invention, method and means for automatically controlling a chemical reaction are provided. The control is based upon the concentration of the reactant present during the reaction. The concentration of reactant in the reaction medium is known to affect the flow properties of the product formed. The reactant concentration during the reaction is controlled by manipulating the introduction of reactant in response to a signal obtained from a computation based upon the measured density of the reaction effluent, a desired reactant concentration and the determined product concentration of the reaction. In one embodiment, the measured density is compared with a desired density computed from the product concentration and desired reactant concentration to obtain the control signal. The measured density and calculated density are values related to and indicative of the reactant concentration in the reaction medium and that concentration of reactant required to produce product having the desired properties, respectively. In another embodiment, reactant concentration is computed from product concentration and measured effluent density and then compared with a desired reactant concentration to obtain the control signal. Additionally, method and means are provided for determining the desired reactant concentration and reaction temperature in the case of polymerizations from selected values for melt index and melt flow ratio of the polymer to be produced.

Accordingly, it is an object of this invention to provide an improved method of controlling chemical reactions.

Another object of this invention is to provide apparatus for controlling chemical reactions.

A further object of this invention is to provide improved polymerization operations whereby a polymer having desired uniform properties is produced.

Other objects, advantages and features of this invention will become apparent upon further study of this disclosure, the drawing and appended claims.

This invention will now be described in more detail with relation to the accompanying drawings in which.

The present invention is broadly applicable to the polymerization processes in which a monomer is contacted with a catalyst in suspension in a liquid. The polymerization process may be of the solution type wherein the polymer is formed in solution as it is soluble in the diluent or reaction medium employed, or the process may be of the so-called particle-form type wherein the polymer is produced as a solid as it is not soluble in the diluent or reaction medium employed. A process applicable to be controlled by this invention is that described by Hogan and Banks in U.S. 2,825,721, issued Mar. 4, 1958. The details of the applicable monomers, reaction conditions and methods of conducting the reaction may be had by referring to said patent.

Figure 1:
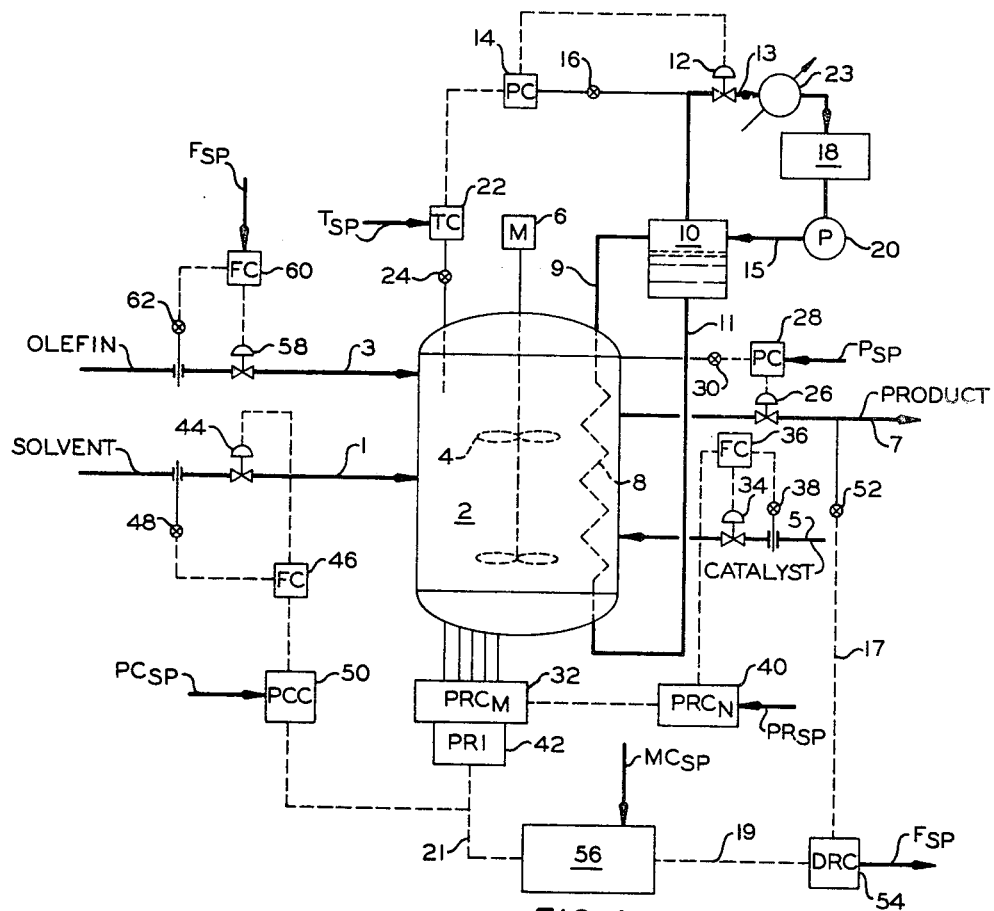
FIGURE 1 is a schematic representation of a polymerization reactor system having one embodiment of the control system of the present invention incorporated therein.

Referring now to FIGURE 1 of the drawings, there is shown a flow diagram which illustrates diagrammatically the present invention. While the invention is described in conjunction with a particular polymerization process, it is to be understood that it is not intended to so limit the invention. The control scheme of this invention is applicable to any polymerization process and also to other conversion processes wherein density of the reaction medium stream is related to and is an indication of the monomer or reactant concentration.

As shown in FIGURE 1, a suitable solvent, such as cyclohexane, enters a polymerization reactor 2 through an inlet conduit 1. A feed material, such as ethylene, enters reactor 2 through an inlet conduit 3. A catalyst enters reactor 2 through an inlet conduit 5. The catalyst, for example, is added to the reactor in the form of a slurry in solvent. Reactor 2 is provided with a stirrer 4 which is driven by a motor 6 and is equipped with suitable cooling coils 8. A cooling jacket for the reactor may be used in place of tubes 8 or in addition thereto, if desired. Reactor effluent is withdrawn through a product conduit 7. This effluent comprises a mixture of polymer, solvent, spent catalyst and unreacted ethylene, and is subsequently passed to suitable separation means, not shown, to recover the desired polymer.

The cooling coils 8 are part of a coolant circulation system which includes conduit 9 through which coolant from the coils passes to flash vessel 10, and conduit 11 which returns condensed coolant to the coils. In the cooling system illustrated a boiling coolant, such as cyclohexane, is employed and the pressure in vessel 10 is regulated so that the coolant in the coils is vaporizing and removing heat of reaction from the reactor to maintain it at constant temperature. The mixture of coolant vapors and fluid passes through conduit 9 into vessel 10 and vapors pass overhead through conduit 13 as controlled by motor valve 12 which is operatively connected to pressure controller 14. Controller 14 receives a signal from pressure transmitter 16 sensing the pressure in vessel 10. Vapors are condensed in heat exchanger 23 and the condensate passes to accumulator 18 and then is returned to vessel 10 through conduit 15 and pump 20. In this manner, the cooling is readily controlled by varying the rate of flow of vapors through conduit 13. Alternatively the pressure in vessel 10 could be controlled by varying the coolant rate through heat exchanger 23. Pressure controller 14 receives a set point produced by temperature controller 22. Controller 22 receives a signal from temperature transmitter 24 sensing the temperature in reactor 2. Temperature controller 22 receives a set point $T_{sp}$ which can be manually introduced or automatically controlled as described later with reference to FIGURE 5. The quantity of reaction effluent passing through conduit 7 is controlled by motor valve 26 which is operatively connected to pressure controller 28. Controller 28 receives a signal from pressure transmitter 30 sensing the pressure in reactor 2. Pressure controller 28 receives a set point $P_{sp}$ which is selected as the desired pressure for reactor 2.

Production rate computer 32, operatively connected by several sensing elements to measure variables of reactor 2, determines the rate at which the polymer is being formed. The quantity of catalyst introduced to reactor 2 through conduit 5 is controlled by motor valve 34 which is operatively connected to flow controller 36. Controller 36 receives a signal from flow transmitter 38 sensing the flow in conduit 5. Flow controller 36 receives a set point manipulator by production rate controller 40. Production rate controller receives a signal indicative of the actual polymer production rate from computer 32 and a set point $PR_{sp}$ which is selected as the desired production rate for reactor 2. The production rate determined by computer 32 is converted to a signal representative of the polymer concentration in reactor 2 by production rate integrator 42 operatively connected to computer 32. The quantity of solvent introduced to reactor 2 through conduit 1 is controlled by motor valve 44 which is operatively connected to flow controller 46. Controller 46 receives a signal from flow transmitter 48 sensing the flow in conduit 1. Flow controller 46 receives a set point manipulated by polymer concentration controller 50. Controller 50 receives a signal indicative of the polymer concentration in reactor 2 from integrator 42 and a set point $PC_{sp}$ which is selected as the polymer concentration desired in reactor 2. The operation of production rate computer 32 and production rate integrator 42 is thoroughly described in U.S. Patent 2,974,017 of L. W. Morgan, issued Mar. 7, 1961. The details of operation of such equipment can be obtained by reference thereto.

The density of the reaction effluent in conduit 7 is measured by density measurement element 52 operatively connected to the effluent conduit. Element 52 can be any means or device for measuring the density of the material in conduit 7. A suitable instrument is a gamma ray detector as described on page 6 of Bulletin T1-164, copyrighted 1964 by Industrial Nucleonics Corporation of Columbus, Ohio. A signal representative of the measured density is transmitted from element 52 through line 17 to density recorder controller 54. A calculated density is obtained by computer 56. The signal representative of polymer concentration in the reactor produced by integrator 42 is introduced to computer 56 through line 21. Computer 56 receives a set point value $MC_{sp}$ representative of the desired monomer concentration in reactor 2 which can be manually introduced or automatically controlled as described later with reference to FIGURE 5. Set point $MC_{sp}$ if manually introduced is based on the artisan's knowledge of the effect of monomer concentration in the reactor on the properties of the polymer produced which has been obtained from prior correlated reaction data. Such prior knowledge shows that a particular monomer concentration in the reactor produces polymer having particular flow properties. Basically, as the monomer concentration increases the flow properties of the polymer produced increase. The calculated density signal produced by computer 56 is introduced to controller 54 through line 19 to manipulate the desired density set point therein. Controller 54 produces a signal $F_{sp}$ representative of the required monomer flow rate to the reactor to obtain polymer having desired flow properties. The quantity of monomer passing through conduit 3 into reactor 2 is controlled by motor valve 58 which is operatively connected to flow controller 60. Controller 60 receives a signal from flow transmitter 62 sensing the flow in conduit 3. Flow controller 60 receives the signal $F_{sp}$ from controller 54 to manipulate the flow set point therein.

Figure 2:
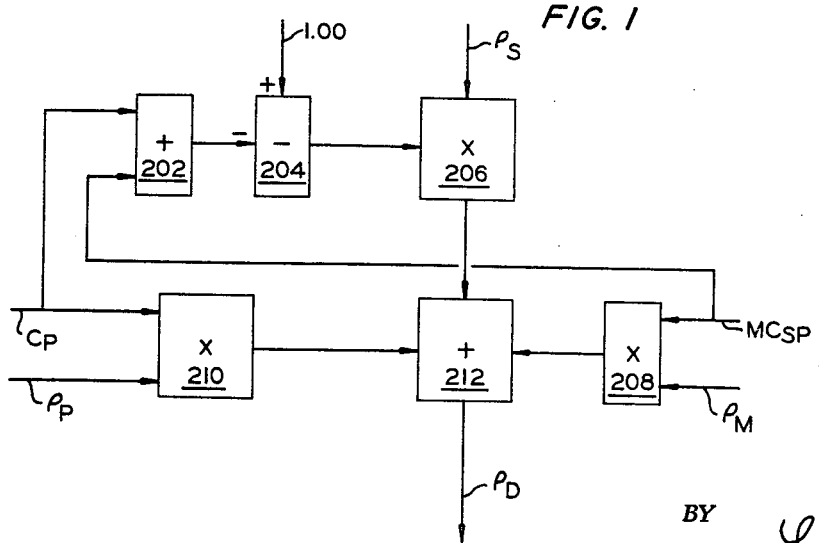
FIGURE 2 is a schematic representation of the computer shown in the system of FIGURE 1.

Referring now to FIGURE 2, analog computer 56 solves a known equation where the desired density of the reaction mixture is equal to the sum of the partial densities of the several components, that is, the desired density of the mixture can be explicity calculated by summing the several products of component concentration time effective density. Thus, the mixture density needed to produce a desired monomer concentration in view of a measured polymer concentration is calculated. The calculated desired density is then employed as the set point to density recorder controller 54 of FIGURE 1 wherein it is compared with the actual measured density signal in line 17. In response to the difference between these two values the flow rate of monomer through conduit 3 into reactor 2 is manipulated by flow control means 62, 60 and 58 so that the measured density will become equal to the calculated desired density.

The operations of computer 56 determine the desired density by automatically solving the following representative equation:

$$\rho_d = C_p \rho_p + MC_{sp}\rho_m + (1.00 - C_p - MC_{sp})\rho_s$$

wherein:

$\rho_d$ = desired density of reaction effluent
$C_p$ = concentration of polymer in reactor
$MC_{sp}$ = concentration of monomer in reactor desired (set point)
$\rho_p$ = density of polymer in reactor (constant per type of polymer at reactor temperature)
$\rho_m$ = density of monomer
$\rho_s$ = density of solvent (constant at a given reaction temperature)

Values for polymer and monomer concentration are introduced to summation element 202. A summation signal from element 202 is introduced to substraction element 204. A signal of 1.00 value is introduced to element 204. A subtraction signal from element 204 is introduced to multiplication element 206. A value for solvent density is introduced to element 206. A multiplication signal from element 206 represents a value for the $(1.00 - C_p - MC_{sp}) \rho_s$ portion of the above equation. Values for monomer concentration and density are introduced to multiplication element 208, which produces a signal representative for the $MC_{sp}\rho_m$ portion of the above equation. Values for polymer concentration and density are introduced to multiplication element 210, which produces a signal representative for the $C_p\rho_p$ portion of the above equation. The representative signals from elements 206, 208, and 210 are introduced to summation element 212 which produces a signal representative for $\rho_d$, the complete solution of the above equation. The thus calculated value for $\rho_d$ passes through line 19 to controller 54 of FIGURE 1 for manipulating the density set point therein.

Figure 3:
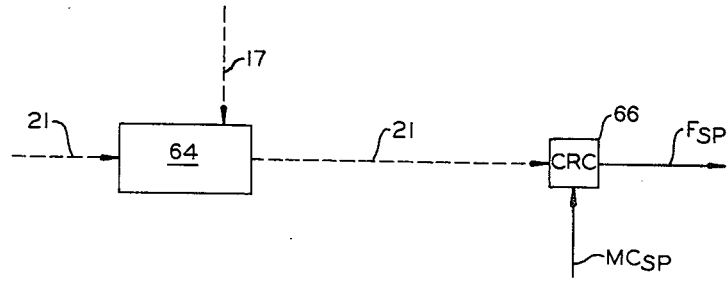
FIGURE 3 is a schematic representation of another embodiment of the control system of this invention usable with the reactor system of FIGURE 1.

FIGURE 3, an alternate computer and related system for control using the variables employed in FIGURE 1, uses like numerals for like signals shown in FIGURE 1. In this embodiment, computer 64 is employed in place of computer 56. The signal representative of polymer concentration in reactor 2 produced by integrator 42 is introduced to computer 64 through line 21. The signal representative of measured density from element 52 is introduced to computer 64 through line 17. Computer 64 calculates the monomer concentration in the reactor. A signal representative of the monomer concentration passes from computer 64 to concentration recorder controller 66. Controller 66 receives a set point $MC_{sp}$ representative of the desired monomer concentration in reactor 2 which can be manually introduced or automatically controlled as described later with reference to FIGURE 5. If set point $MC_{sp}$ is manually introduced it will be chosen as described above with reference to computer 56 and FIGURE 1. Controller 66 produces a signal $F_{sp}$ representative of the required monomer flow rate to the reactor to obtain polymer having desired flow properties. The $F_{sp}$ signal from controller 66 is introduced to flow controller 60 for subsequent manipulations as described with the above reference to FIGURE 1.

Figure 4:
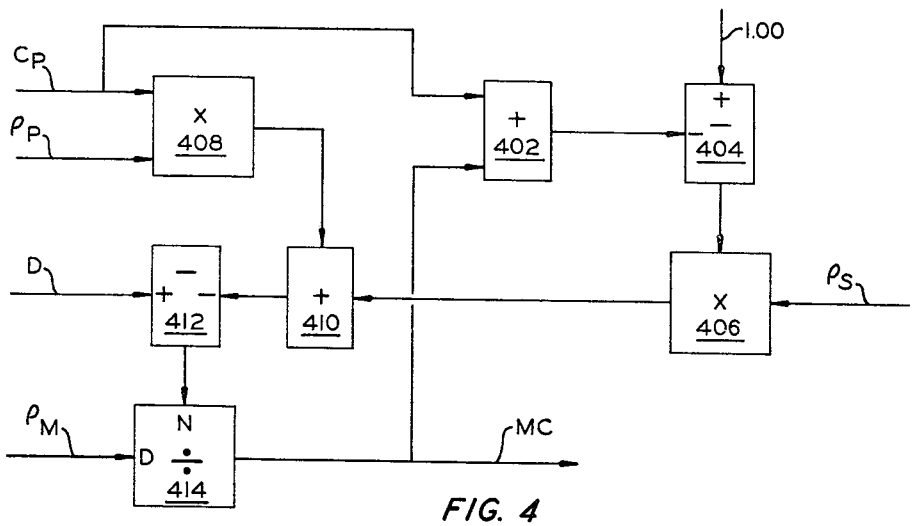
FIGURE 4 is a schematic representation of the computer shown in FIGURE 3.

Referring now to FIGURE 4, analog computer 64 solves the equation used in computer 56 but rearranged into implicit form to derive the concentration of monomer existing within reactor 2 in view of the measured polymer concentration and the measured mixture density. The calculated concentration is employed in concentration recorder controller 66 of FIGURE 3 as the measurement thereto, and is therein compared with a desired (set point) value of monomer concentration. This set point is chosen from the artisan's prior polymerization experience or determined in a manner as will be described with reference to FIGURES 5 and 6. In response to the difference between these two values determined by controller 66, the flow of monomer through conduit 3 into reactor 2 is manipulated by flow control means 62, 60 and 58 so as to obtain the desired monomer concentration within reactor 2.

The operations of computer 64 determine the monomer concentration in the reactor by automatically solving the following representative equation:

$$MC = \frac{D - C_p\rho_p - (1.00 - C_p - MC)\rho_s}{\rho_m}$$

wherein:

MC = monomer concentration, calculated
D = measured density of reactor effluent

The other symbols employed are as defined in the prior formula.

Values for polymer and monomer concentration are introduced to summation element 402. A summation signal from element 402 is introduced to subtraction element 404. A signal of 1.00 value is introduced to element 404. A subtraction signal from element 404 is introduced to multiplication element 406. A value for solvent density is introduced to element 406. A multiplication signal from element 406 represents a value for the $(1.00 - C_p - MC)\rho_s$ portion of the above equation. Values for polymer concentration and density are introduced to multiplication element 408, which produces a signal representative of the $C_p\rho_p$ portion of the above equation. The representative signals from elements 406 and 408 are introduced to summation element 410. The summation signal from element 410 is introduced to subtraction element 412. A value for reactor density is introduced to element 412. A subtraction signal from element 412 representative of the numerator portion of the above equation is introduced to divider element 414. A value for monomer density is introduced as the denominator to divider element 414. Element 414 produces a signal representative of MC, the complete solution of the above equation. The thus calculated value for MC passes through line 21 to controller 66 as described above.

The explicit method of FIGURES 1 and 2, and the implicit method of FIGURES 1, 3 and 4 thus provide a choice between two calculation-control methods so that the one which is best in the sense of computing accuracy, process dynamic response and other criteria may be chosen for a particular situation.

Figure 5:
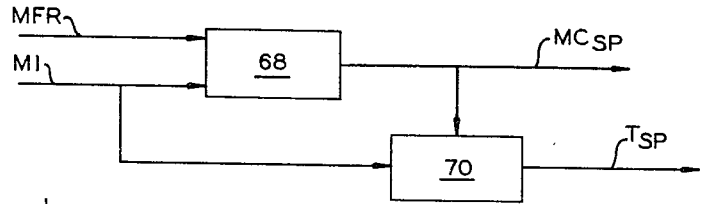
FIGURE 5 is a schematic representation of a system for use in cooperation with the control system of FIGURES 1 and 3.

Referring now to FIGURE 5 there is shown in block form a computer system whereby the desired (set points) values for reactor 2 of monomer concentration, $MC_{sp}$, and temperature, $T_{sp}$, are automatically produced so as, in the light of previously-determined graphical and mathematical correlations of reactor operating data, to achieve desired values of polymer melt index and polymer melt flow ratio. These properties, along with polymer production rate $PR_{sp}$ and polymer concentration in the reactor effluent $PC_{sp}$, are the ultimate requirements placed upon reactor operation to produce polymer at a desired rate, as a processable solution in solvent and having salable characteristics.

Values representative of the melt index and melt flow ratio of the polymer to be produced are introduced to computer 68 which calculates a signal representative of the required monomer concentration in the reactor to produce the desired polymer. This signal is used as the set points for computer 56. FIGURE 1, and controller 66, FIGURE 3. The value representative of the melt index of the polymer to be produced is introduced to computer 70. The calculated set point $MC_{sp}$ from computer 68 is introduced to computer 70. Computer 70 calculates a signal $T_{sp}$ representative of the required temperature in the reactor to produce the desired polymer. This signal is used as the set point $T_{sp}$ for controller 22 of FIGURE 1.

Figure 6:
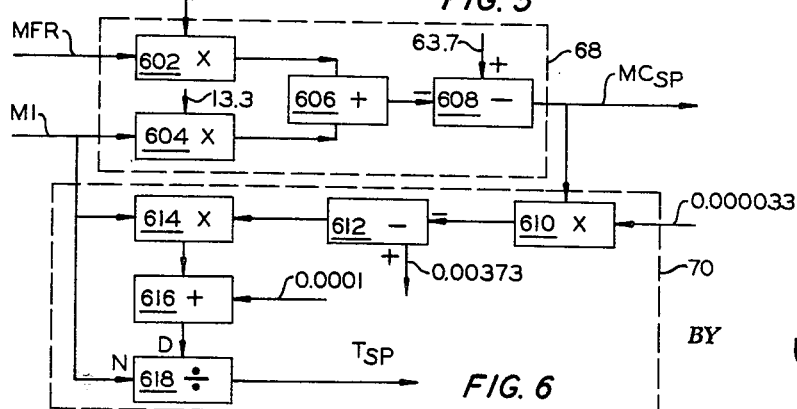
FIGURE 6 is a schematic representation of the computer shown in FIGURE 5.

The operations of computers 68 and 70 as shown in FIGURE 6 determine the monomer concentration set point and temperature set point for the reactor by automatically solving the following representative equations:

(A)  $MC_{sp} = -13.3(MI) + 63.7 - 0.51(MFR)$ (B)  $T_{sp} = \dfrac{MI}{(0.00373 - 0.000033MC_{sp})MI + 0.0001}$ wherein:

$MC_{sp}$ = monomer concentration required in the reactor
MI = melt index of the polymer desired (ASTM D1238–57T, Test C)
MFR = melt flow ratio of the polymer desired (HLMI—ASTM D1238–57T, Test F divided by MI—ASTM D1238–57T, Test C)
$T_{sp}$ = temperature required in the reactor Signals for MFR and 0.51 are introduced to multiplication element 602, which produces a signal representing the 0.51 (MFR) portion of Equation A. Signals for MI and 13.3 are introduced to multiplication element 604, which produces a signal representing the 13.3 (MI) of Equation A. The signals from elements 602 and 604 pass to summation element 606 which produces the sum 13.3 (MI) + 0.51 (MFR) and introduces a representative signal thereof to subtraction element 608. A signal for 63.7 is introduced to element 608. Element 608 produces a signal representative of $MC_{sp}$, the complete solution of Equation A. The thus calculated value for $MC_{sp}$ passes to computer 56 of FIGURE 1 or controller 66 of FIGURE 3 as the set points $MC_{sp}$. The value for $MC_{sp}$ from element 608 also passes to multiplication element 610 to which a signal for 0.000033 is introduced. A multiplication signal from element 610 passes to subtraction element 612 to which a signal for 0.00373 is introduced. A subtraction signal from element 612 passes to multiplication element 614 to which passes a signal for MI. Element 614 produces a signal representing the $(0.00373 - 0.000033MC_{sp})$ MI portion of Equation B. This signal is introduced to summation element 616 to which is introduced a signal for 0.0001. Element 616 produces a signal representative of the denominator portion of Equation B which is introduced to divider element 618. A signal for MI is introduced to element 618 as the numerator. Element 618 produces a signal representative for $T_{sp}$, the complete solution of Equation B. The thus calculated value for $T_{sp}$ from element 618 passes to controller 22 as the set point $T_{sp}$.

Analog computing elements and configurations are used herein for the purpose of simplifying and clarifying the description of the inventive control method. In considering equipment for commercial plant control, particularly where a plurality of reactors are involved, those skilled in the computing art would investigate economically and technically the time-shared use of digital computing apparatus, digital differential analyzer and/or other computing methods. Individual situations will, to a large extent, influence the choice of particular equipment, however, the inventive method herein portrayed by analog computing is adaptable to all modes of computing.

The equations upon which the analog computers, generally designated 68 and 70, of FIGURES 5 and 6, are based were derived from pilot and full scale plant testing. Here, test results expressing the interrelations among polymer melt index, polymer melt flow ratio and monomer concentration (mol percent ethylene) in the reactor were plotted and an empirically derived equation fitted thereto so as to provide the equation $$MC_{sp} = -13.3(MI) + 63.7 - 0.51(MFR)$$

of FIGURE 6 which is solved by computer 68. Similarly, the experimentally determined interrelationships among polymer melt index, monomer concentration and reactor temperature were plotted and an empirical equation was fitted thereto so as to provide the equation:

$$T_{sp} = \frac{MI}{(0.00373 - 0.000033 MC_{sp})MI + 0.0001}$$

of FIGURE 6 which is solved by computer 70.

It may therefore be observed that the equations and their method of computation in FIGURE 6 are primarily of a predictive or feed-forward nature, in that the desired values of polymer melt index and melt flow ratio are impressed thereon from which the monomer concentration and the reactor temperature required to produce the desired polymer properties are determined and applied to the process. The temperature set point is applied to its cascade type of control system, while the monomer concentration is applied to the inventive density-computer-control system of FIGURES 1 and 2 or FIGURES 1, 3 and 4. With the other independent variables of the reactor, namely the polymer production rate and the polymer concentration in the reactor effluent, being under a feedback form of computer control (as taught by prior art), the system is nearly completely automated. If economic factors may be applied to the four above-mentioned primary process requirements (set points) and to the use of materials (monomer, catalyst and solvent) and energy (cooling, heating, pumping, etc.) within the process, a so-called profit rate mathematical model may be derived which in turn may, through an optimizing procedure, be used to determine the four primary set points whereby the process may be controlled at maximum profit rate, for example, while producing the desired polymer.

The inventive control method has applicability to other processes than that to which it is herein applied, namely, the polymerization of ethylene by chromium oxide catalyst in the presence of cyclohexane solvent to a high molecular weight resin of specific properties. In this regard, it is to be understood that for other processes the equations and computations of computers 56 and 64 will be applicable, but the numerical values in the equations for computers 68 and 70 will be derived in the manner herein set forth from data related thereto although the form of the equations will be as specifically shown herein. Particularly, chemical synthesis processes other than polymerization may be similarly automatically controlled wherein the charge rate of the catalytic (or reaction-initiating) system (comprising one or a plurality of catalyst components) influences the time rate of product generation (the latter being measurable and convertible into product concentration), wherein the reactor effluent density may be interpreted as concentration of reactant and wherein correlation of reaction conditions with important properties of the product are known and are usable to cause the reactor to produce desired product. As is commonly known, certain portions of a complex system, such as herein disclosed, are capable of independent operation, and do not require the entire system for operability. Such a situation exists herein where reactor effluent density measurement-control of monomer feed rate does not require the presence of the product properties set point computers of FIGURES 5 and 6 to be operable. The degree of automation of a process is generally based upon economic considerations, which have dictated a substantial increase in automation over the past few years and this trend is expected to further continue in the future.

Reasonable variations and modifications are possible within the scope of the foregoing disclosure, the drawings, and the appended claims to the invention.

I claim:

1. In a polymerization system wherein monomer, catalyst and diluent are directed to a polymerization reactor, the resulting reaction mixture of monomer, polymer, catalyst and diluent is agitated in said reactor, and a reaction effluent stream is withdrawn from said reactor; a control system comprising means to measure the actual density of said reaction mixture and to establish a first signal representative thereof, means for determining the concentration of said polymer in said reaction mixture and for establishing a second signal representative thereof, means for establishing a third signal representative of the desired concentration of said monomer in said reaction mixture, means responsive to said second and third signals for establishing a fourth signal representative of the density which said reaction mixture would have with the determined polymer concentration and the desired monomer concentration, means responsive to said first signal and said fourth signal to establish a fifth signal representative of the flow rate of monomer to said reactor required to achieve the density which said reaction mixture would have with the determined polymer concentration and the desired monomer concentration, and means responsive to said fifth signal to manipulate said flow rate of monomer to maintain the actual density of said reaction mixture substantially equal to said density which said reaction mixture would have with the determined polymer concentration and the desired monomer concentration to thereby maintain the actual monomer concentration in said reaction mixture substantially equal to said desired monomer concentration.

2. Apparatus in accordance with claim 1 wherein said means for establishing a third signal representative of the desired concentration of said monomer in said reaction mixture comprises means for establishing a sixth signal representative of the desired value of melt index for said polymer, means for establishing a seventh signal representative of the desired value of melt flow ratio for said polymer and means responsive to said sixth and seventh signals for producing said third signal.

3. Apparatus in accordance with claim 2 further comprising means responsive to said sixth and seventh signals for establishing an eighth signal representative of the temperature required for said reaction mixture in said reactor, and means for controlling the temperature of said reaction mixture in said reactor responsive to said eighth signal.

4. An apparatus in accordance with claim 1 further comprising means for establishing a sixth signal representative of the desired concentration of said polymer in said reaction mixture, means for comparing said second and sixth signals and for manipulating the flow rate of said diluent into said reactor responsive to such comparison to maintain the actual concentration of polymer in said reaction mixture substantially equal to said desired concentration of polymer in said reaction mixture.

5. Apparatus in accordance with claim 1 further comprising means for establishing a sixth signal representative of the rate of production of polymer in said reactor, and means responsive to said sixth signal to manipulate the rate of addition of said catalyst to said reactor to maintain said rate of production substantially constant.

6. Apparatus in accordance with claim 3 further comprising means for establishing a ninth signal represenative of the desired concentration of said polymer in said reaction mixture, means for comparing said second and ninth signals and for manipulating the flow rate of said diluent into said reactor responsive to such comparison to maintain the actual concentration of polymer in said reaction mixture substantially equal to said desired concentration of polymer in said reaction mixture.

7. Apparatus in accordance with claim 6 further comprising means for establishing a tenth signal representative of the rate of production of polymer in said reactor, and means responsive to said tenth signal to manipulate the rate of addition of said catalyst to said reactor to maintain said rate of production substantially constant.

8. In a polymerization system wherein monomer, catalyst and diluent are directed to a polymerization reactor, the resulting reaction mixture of monomer, polymer, catalyst and diluent is agitated in said reactor, and a reaction effluent stream is withdrawn from said reactor; a control system comprising means to measure the actual density of said reaction mixture and to establish a first signal representative thereof, means for determining the concentration of said polymer in said reaction mixture and for establishing a second signal representative thereof, means for establishing a third signal representative of the desired concentration of said monomer in said reaction mixture, means responsive to said first and second signals for establishing a fourth signal representative of the actual concentration of said monomer in said reaction mixture, means responsive to said third signal and said fourth signal to establish a fifth signal representative of the flow rate of monomer to said reactor required to achieve the desired monomer concentration, and means responsive to said fifth signal to manipulate said flow rate of monomer to thereby maintain the actual monomer concentration in said reaction mixture substantially equal to said desired monomer concentration.

9. Apparatus in accordance with claim 8 wherein said means for establishing a third signal representative of the desired concentration of said monomer in said reaction mixture comprises means for establishing a sixth signal representative of the desired value of melt index for said polymer, means for establishing a seventh signal representative of the desired value of melt flow ratio for said polymer, and means responsive to said sixth and seventh signals for producing said third signal.

10. Apparatus in accordance with claim 9 further comprising means responsive to said sixth and seventh signals for establishing an eighth signal representative of the temperature required for said reaction mixture in said reactor, and means for controlling the temperature of said reaction mixture in said reactor responsive to said eighth signal.

11. Apparatus in accordance with claim 8 further comprising means for establishing a sixth signal representative of the desired concentration of said polymer in said reaction mixture, means for comparing said second and sixth signals and for manipulating the flow rate of said diluent into said reactor responsive to such comparison to maintain the actual concentration of polymer in said reaction mixture substantially equal to said desired concentration of polymer in said reaction mixture.

12. Apparatus in accordance with claim 8 further comprising means for establishing a sixth signal representative of the rate of production of polymer in said reactor, and means responsive to said sixth signal to manipulate the rate of addition of said catalyst to said reactor to maintain said rate of production substantially constant.

13. Apparatus in accordance with claim 10 further comprising means for establishing a ninth signal representative of the desired concentration of said polymer in said reaction mixture, means for comparing said second and ninth signals and for manipulating the flow rate of said diluent into said reactor responsive to such comparison to maintain the actual concentration of polymer in said reaction mixture substantially equal to said desired concentration of polymer in said reaction mixture.

14. Apparatus in accordance with claim 13 further comprising means for establishing a tenth signal representative of the rate of production of polymer in said reactor, and means responsive to said tenth signal to manipulate the rate of addition of said catalyst to said reactor to maintain said rate of production substantially constant.

15. In a process for the polymerization of a monomer in the liquid phase in a polymerization reaction zone in the presence of a liquid diluent wherein said monomer, catalyst and said diluent are directed to said polymerization reaction zone, the resulting reaction mixture of monomer, polymer, catalyst and diluent is agitated in said reaction zone, and a reaction effluent stream is withdrawn from said reaction zone; and improved control procedure comprising measuring the actual density of said reaction mixture and establishing a first signal representative thereof, determining the concentration of said polymer in said reaction mixture and establishing a second signal representative thereof, establishing a third signal representative of the desired concentration of said monomer in said reaction mixture, establishing responsive to said second and third signals a fourth signal representative of the density which said reaction mixture would have with the determined polymer concentration and the desired monomer concentration, establishing responsive to said first signal and said fourth signal a fifth signal representative of the flow rate of monomer to said reaction zone required to achieve the density which said reaction mixture would have with the determined polymer concentration and the desired monomer concentration and manipulating responsive to said fifth signal said flow rate of monomer to maintain the actual density of said reaction mixture substantially equal to said density which said reaction mixture would have with the determined polymer concentration and the desired monomer concentration to thereby maintain the actual monomer concentration in said reaction mixture substantially equal to said desired monomer concentration.

16. A process in accordance with claim 15 wherein said monomer comprises ethylene.

17. In a process for the polymerization of a monomer in the liquid phase in a polymerization reaction zone in the presence of a liquid diluent wherein said monomer, catalyst and said diluent are directed to said polymerization reaction zone, the resulting reaction mixture of monomer, polymer, catalyst and diluent is agitated in said reaction zone, and a reaction effluent stream is withdrawn from said reaction zone; an improved control procedure comprising measuring the actual density of said reaction mixture and establishing a first signal representative thereoof, determining the concentration of said polymer in said reaction mixture and establishing a second signal representative thereof, establishing a third signal representative of the desired concentration of said monomer in said reaction mixture, establishing responsive to said first and second signals a fourth signal representative of the actual concentration of said monomer in said reaction mixture, establishing responsive to said third signal and said fourth signal a fifth signal representative of the flow rate of monomer to said reaction zone required to achieve the desired monomer concentration, and manipulating responsive to said fifth signal and flow rate of monomer to thereby maintain the actual monomer concentration in said reaction mixture substantially equal to said desired monomer concentration.

18. A process in accordance with claim 17 wherein said monomer comprises ethylene.

References Cited

UNITED STATES PATENTS

| | | | |
|---|---|---|---|
| 2,974,017 | 3/1961 | Morgan | 260—94 |
| 2,989,517 | 6/1961 | Hanson et al. | 260—94 |

JAMES A. SEIDLECK, Primary Examiner

U.S. Cl. X.R.

260—94.2, 93.5, 93.7; 23—230, 253